(12) United States Patent
Kenig-Dodiuk

(10) Patent No.: US 6,897,266 B2
(45) Date of Patent: May 24, 2005

(54) DENDRITICALLY MODIFIED POLYURETHANES

(75) Inventor: Hannah Kenig-Dodiuk, Haifa (IL)

(73) Assignee: Shenkar College of Engineering and Design, Ramat Gan (IL)

( * ) Notice: Subject to any disclaimer, the term of this patent is extended or adjusted under 35 U.S.C. 154(b) by 166 days.

(21) Appl. No.: 10/351,610

(22) Filed: Jan. 27, 2003

(65) Prior Publication Data

US 2003/0176596 A1 Sep. 18, 2003

(30) Foreign Application Priority Data

Jan. 28, 2002 (DE) .......................... 102 03 058

(51) Int. Cl.$^7$ .......................... C08G 18/32; C08G 18/40
(52) U.S. Cl. .................. 525/459; 525/453; 525/454; 525/460
(58) Field of Search ................. 525/453, 454, 525/459, 460

(56) References Cited

U.S. PATENT DOCUMENTS

| | | | | |
|---|---|---|---|---|
| 4,694,064 A | * | 9/1987 | Tomalia et al. | 528/332 |
| 5,136,014 A | * | 8/1992 | Figuly | 528/272 |
| 5,932,678 A | * | 8/1999 | Meier et al. | 528/28 |
| 5,981,684 A | * | 11/1999 | Bruchmann et al. | 528/45 |
| 6,093,777 A | | 7/2000 | Sorensen et al. | |
| 6,114,489 A | * | 9/2000 | Vicari et al. | 528/84 |
| 6,376,637 B1 | * | 4/2002 | Bruchmann et al. | 528/60 |
| 6,462,144 B1 | * | 10/2002 | Ramesh et al. | 525/438 |
| 6,534,600 B2 | * | 3/2003 | Dvornic et al. | 525/474 |
| 2002/0119320 A1 | * | 8/2002 | Ramesh et al. | 428/423.1 |
| 2004/0068028 A1 | * | 4/2004 | Baumgart et al. | 522/148 |

FOREIGN PATENT DOCUMENTS

| | | |
|---|---|---|
| EP | 1 070 748 A1 | 1/2001 |
| WO | WO 00/22030 | 4/2000 |

OTHER PUBLICATIONS

Machine Translation of JP 2000–313732 Nov. 2000, Bruchmann et al., obtained from the JPO Web–site.*
O A. Matthews et al Prog Poly Sci vol. 23 pp 1–56, 1998.
T Emrick et al., Polym Bull (Berlin) (2000) 45 (1) pp1–7R.
Mezzenga et al. (Compos. Sci Technol. (2001), 612 (5), pp 787–795).

* cited by examiner

*Primary Examiner*—Jeffrey B. Robertson
(74) *Attorney, Agent, or Firm*—Pearl Cohen Zedek Latzer LLP

(57) ABSTRACT

This invention relates to dendritically modified polyurethane, to a process for preparing the dendritically modified polyurethane and to uses thereof.

9 Claims, 1 Drawing Sheet

DENDRITICALLY MODIFIED POLYURETHANES

This Application claims the priority of German Application No. DE 102 03 058.8, filed Jan. 28, 2002.

FIELD OF THE INVENTION

This invention is in the area of polymer chemistry. Specifically, this invention relates to dendritically modified polyurethane, to a process for preparing the dendritically modified polyurethane and to use thereof as elastomers, coating compositions and/or as adhesive.

BACKGROUND OF THE INVENTION

Highly branched ("dendritic") macromolecules are known in polymer chemistry. These highly branched compounds have large number of reactive groups; an approximately spherical form and can incorporate guest molecules inside the macromolecules. More details on the highly branched macromolecules can be found, for example, in O. A. Matthews et al., Prog. Polym. Sci., Vol. 23, pp. 1–56, 1998.

Thus, by stepwise synthesis, structures with a very regular composition are obtained which are referred to as dendrimers. This mode of synthesis is multistage and complex. In general, it required protective group reactions and additional purifying operations after each stage, which makes synthesis not only time-consuming but also costly. The highly branched dendrimer end products are highly pure and in particular they are monodisperse, which means that all the macromolecules have the same molecular weight and there is no molar weight distribution (O. A. Matthews et al., Prog. Polym. Sci., Vol. 23, pp. 1–56, 1998, page 5).

Another group of highly branched compounds is the hyperbranched polymers, which unlike the dendrimers do exhibit a molecular weight distribution (O. A. Matthews et al., Prog. Polym. Sci., Vol. 23, pp. 1–56, 1998, page 5). Generally, hyperbranched polymers are obtained starting from ABn-type monomers (wherein $n \geq 2$) in a one-stage reaction, described for example in T. Emrick et al., Polym. Bull. (Berlin) (2000), 45 (1) pp. 1–7.

From the prior art it is known that dendrimers or hyperbranched polymers can be used as auxiliaries and additives in the preparation of polymeric materials, in order to obtain an improvement in the physical and chemical properties of the polymeric material. R. Mezzenga et al. (Compos. Sci. Technol. (2001), 612 (5), pp. 787–795) describes the use of dendritic hyperbranched polymers as modifiers for epoxy resins. Similarly, highly branched oligomers, which are disclosed in WO 00/22030, can be used for modifying epoxy resins. European Application EP-A 1 070 748 shows the effect of highly branched polyesters as flow agents and levelling agents in powder coating materials.

U.S. Pat. No. 6,093,777 describes dentritic hyperbranched polyesters as impact modifiers for thermo-setting resins. These dendritic macromolecules contain ester bonds, in combination with ether bonds. The disadvantage of these dentritic hyperbranched polyesters is the presence of the ester function. Due to the hydrolytic degradation in an acid or in an alkaline medium and/or the hydrolytic degradation of the ester function as a result of microorganisms, the lifetime of, the polyurethane elastomers or of adhesives made according to the U.S. Pat. No. 6,093,777 is very limited.

SUMMARY OF THE INVENTION

This invention provides an improved polyurethane and process for preparing the same by using a hyperbranched polymer. The polyurethane of the invention has an improved extension and strength properties. The hyperbranched polymer in one embodiment of the invention contains a reactive end group, which can react with an isocyanate functional group.

The invention provides a process for preparing dendritically modified polyurethane by reacting a diisocyanate and/or polyisocyanate with a compound, which is reactive with isocynante and a hyperbranched polymer, which contains a reactive end group, which can react with an isocyanate functional group.

In another embodiment, the invention provides a dendritically modified polyurethane by reacting a diisocyanate and/or polyisocyanate with a compound, which is reactive with isocynante and a hyperbranched polymer, which contains a reactive end group which can react with an isocyanate functional group.

DESCRIPTION OF THE DETAILED EMBODIMENTS

Figure 1:
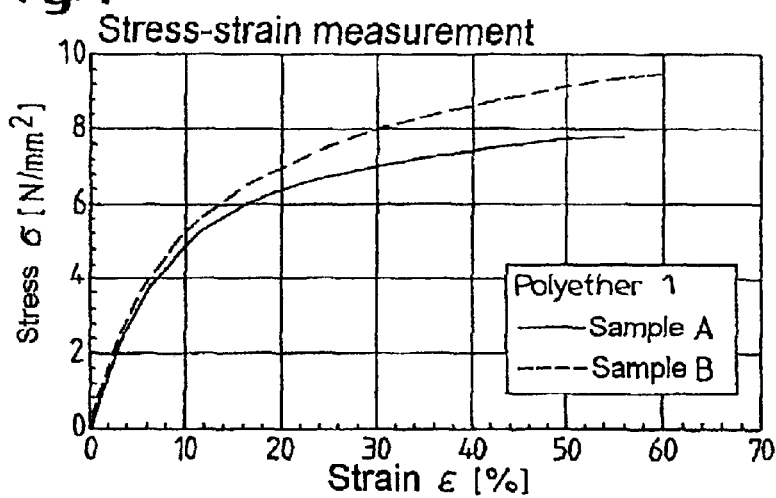
FIG. 1 demonstrates stress-strain measurements of sample A vs. Sample B (see examples).

This invention provides an improved polyurethane or elastomeric polyurethane as two-component polyurethane system, which do not have the disadvantages of the prior art polyurethane. The polyurethane of the invention has markedly improved extension and mechanic strength properties when they are prepared by using hyperbranched polymer. This is demonstrated in the Examples section and in FIGS. 1–3 below.

In one embodiment, the invention provides a process for preparing dendritically modified polyurethane by reacting a(diisocyanate and/or polyisocyanate with an a compound which is reactive with isocyanate and a hyperbranched polymer, which contains a reactive end group, which can react with an isocyanate functional group.

In another embodiment of the invention, the hyperbranched polymer does not have ester bonds.

In one embodiment of the invention, the diisocyanate and/or polyisocyanate are compounds, which are represented by formula (I) Q(NCO)n (I) in which, n is from 2 to 5, or in another embodiment from 2 to 4, and Q represents an organic radical which may contain both ether and/or ester groups and/or carbonic ester groups and/or urethane groups and also further heteroatoms.

In another embodiment of this invention, the compounds of formula I may be, for example without limitation, hexamethylene diisocyanate, 1,12-dodecane diisocyanate, cyclobutane 1,3-diisocyanate, cyclohexane 1,3- and 1,4-diisocyanate, and any mixtures of these isomers, 1-isocyanato-3,3,5-trimethyl-5-isocyanatomethylcyclohexane, hexahydro-1,3- and/or -1,4-phenylene diisocyanate, perhydro-2,4'- and/or -4,4'-diphenylmethane diisocyanate, 1,3- and 1,4-phenylene diisocyanate, 2,4- and 2,6-tolylene diisocyanate, and any mixtures of these isomers, diphenylmethane 2,4'- and 4,4'-diisocyanate, naphthylene 1,5-diisocyanate, triphenylmethane 4,4',4"-triisocyanate or polyphenyl-polymethylene-polyisocyanates, such as are obtainable by formaldehyde-aniline polycondensation and subsequent phosgenation.

In another embodiment of this invention, the diisocyanates and/or polyisocyanates are the prepolymers known from polyurethane chemistry which have terminal isocyanate groups and come from the molecular weight range, in one embodiment, from 400 to 20,000. In another embodiment, the molecular weight range of the diisocyanates and/or polyisocyanates is from 1000 to 15,000. These compounds are prepared, as is well known to one skilled in the art, by reacting excess amounts of simple polyisocyanates with organic compounds having at least two isocyanate-reactive groups, which can be in one embodiment polyhydroxyl compounds.

In one embodiment of the invention, the polyisocyanate is, for example, without being limited, hexamethylene diisocyanate, 1,12-dodecane diisocyanate, cyclobutane 1,3-diisocyanate, cyclohexane 1,3- and 1,4-diisocyanate, and any mixtures of these isomers, 1-isocyanato-3,3,5-trimethyl-5-isocyanatomethylcyclohexane, hexahydro-1,3- and/or -1,4-phenylene diisocyanate, perhydro-2,4'- and/or -4,4'-diphenylmethane diisocyanate, 1,3- and 1,4-phenylene diisocyanate, 2,4- and 2,6-tolylene diisocyanate, and any mixtures of these isomers, diphenylmethane 2,4'- and 4,4'-diisocyanate, naphthylene 1,5-diisocyanate, triphenylmethane 4,4',4''-triisocyanate or polyphenyl-polymethylene polyisocyanates, such as are obtainable by formaldehyde-aniline polycondensation and subsequent phosgenation.

In another embodiment of the invention, the polyisocyanate is the technical-grade polyisocyanates customary in polyurethane chemistry, such as hexamethylene diisocyanate, 1-isocyanato-3,3,5-trimethyl-5-isocyanatomethylcyclohexane (isophorone diisocyanate, IPDI), perhydro-4,4'-diphenylmethane diisocyanate, 2,4- and 2,6-tolylene diisocyanate and any mixtures of these isomers, diphenylmethane 4,4'-diisocyanate and its mixtures with the corresponding 2,2' and 2,4' isomers, polyphenyl-polymethylene polyisocyanates, such as are obtainable by formaldehyde-aniline polycondensation and subsequent phosgenation in a manner known per se.

In another embodiment of the invention, the polyisocyanate is aromatic polyisocyanates such as, for example, 2,4- and 2,6-tolylene diisocyanate and also any mixtures of these isomers, diphenylmethane 4,4'-diisocyanate and its mixtures with the corresponding 2,2' and 2,4' isomers, polyphenyl-polymethylene polyisocyanate.

In another embodiment of this invention, the organic compound is, for example, both simple and polyhydric alcohols in the molecular weight range in one embodiment, from 62 to 599, or in another embodiment from 62 to 200, such as ethylene glycol, trimethylolpropane, propane-1,2-diol or butane-1,4-diol.

In another embodiment of this invention, the organic compound is, for example without limitation, polythioether polyol, hydroxyl-containing polyacetal polyhydroxy polycarbonate, hydroxyl-containing polyesteramide or hydroxyl-containing copolymers of olefinically unsaturated compound.

In one embodiment of this invention, the organic compound has an average molecular weight of 800 and 12,000, in another embodiment, the molecular weight is between 800 and 10,000, and in another embodiment the molecular weight is between 1000 and 7000. In one embodiment of the invention, the organic compound has a functional group, such as for example, a hydroxyl group and functionality of at least 2 or 2 to 3, or more than 2 such as, for example, polyethers and vinyl-polymer-modified polyethers (see for example in U.S. Pat. No. 4,218,543, column 7, lines 34 to 59), polyesters (e.g. in U.S. Pat. No. 4,218,543, column 8, lines 18 to 55), polycarbonates (e.g. in U.S. Pat. No. 4,218,543 column 9, lines 3 to 9) and polyesteramides (e.g. in U.S. Pat. No. 4,218,543, column 9, lines 10 to 15).

In another embodiment, the organic compound is polyether and vinyl-polymer-modified polyether and/or polycarbonate.

In another embodiment, the diisocyanate or the polyisocyanate may be a NCO prepolymer obtained from one or more aromatic polyisocyanate and one or more hydroxyl-containing polyether or vinyl-polymer-modified polyether and/or polycarbonate having an average molecular weight of at least 400 and a functionality of at least 2. The NCO prepolymers are prepared in a way known in the art by reacting organic compounds containing at least two isocyanate-reactive groups with simple polyisocyanate of the type mentioned by way of example above, wherein the NCO/OH ratio is in the range, in one embodiment, from 1.5:1 to 20:1. In another embodiment, NCO/OH ratio is in the range of 3:1 to 15:1. The NCO prepolymers have, in one embodiment, an NCO content of 1 to 50%. In another embodiment the NCO content is from 1.5 to 25%. In another embodiment, the NCO content may be from 2.5 to 20% by weight.

The term "NCO prepolymers" refers both to the reaction product of organic compounds with excess simple polyisocyanate and to isocyanate prepolymer, which does not contain free isocyanate. The preparation of such prepolymers is known and is described in Houben-Weyl, Methoden der org. Chemie, 4th Edition, Volume E 20, Makromolekulare Stoffe, Part 2, pages 1613 to 1616.

The compound which is reactive with isocyanate is in one embodiment of the invention, comprises at least one hydroxyl-containing, low molecular mass chain extender having a molecular weight of at least 62 and a functionality of at least 2. In another embodiment the compound, which is reactive with isocyanate, comprises at least one aliphatic, aromatic or cycloaliphatic diamine or triamine having a molecular weight of at least 60.

The hydroxyl-containing, low molecular mass chain extender is for example, low molecular mass polyhydric alcohols having a molecular weight range from 62 to 400. In another embodiment the hydroxyl-containing, low molecular mass chain extender is for example ethylene glycol, diethylene glycol, 1,4-dihydroxybutane, 1,6-dihydroxybutane, trimethylolpropane, glycerol, pentaerythritol, sorbitol or sucrose. In another embodiment of the invention, the hydroxyl-containing, low molecular mass chain extender is a polyhydric alcohol having a functionality of 2, such as ethylene glycol, diethylene glycol, 1,4-dihydroxybutane or 1,6-dihydroxybutane.

The diamine or triamine have, in one embodiment of the invention, a molecular weight of from 60 to 300. The diamine may be, for example, without being limited, 1,4-diaminobenzene, 2,4-diaminotoluene, 2,4'- and/or 4,4'-diaminodiphenylmethane, 1,4-diaminobutane, 1,6-diaminohexane, ethylenediamine, isophoronediamine, is (4-aminocyclohexyl) methane or 1,4-diaminocyclohexane.

In one embodiment, the diamine is aliphatic types such as, for example, 1,4-diaminobutane, 1,6-diaminohexane, isophoronediamine, bis(4-aminocyclohexyl) methane, 1,4-diaminocyclohexane, ethylenediamine, or its homologues, or piperazine.

In another embodiment, the diamine include compounds such as 2,4-diaminomesitylene, 1,3,5-triethyl-2,4-diaminobenzene, 1,3,5-triisopropyl-2,4-diaminobenzene, 1-methyl-3,5-diethyl-2,4-diaminobenzene, its technical-grade mixtures with 1-methyl-3,5-diethyl-2,6-diaminobenzene, 4,6-dimethyl-2-ethyl-1,3-diaminobenzene, 3,5,3',5'-tetraethyl-4,4'-diaminodiphenylmethane, 3,5,3',5'-tetraisopropyl-4,4'-diaminodiphenylmethane or 3,5-diethyl-3,5'-diisopropyl-4,4'-diaminodiphenylmethane. Any desired mixtures of aromatic diamine of this kind may likewise be employed.

The hyperbranched polymer of the invention contains a reactive end group that can react with an isocyanate functional group. In another embodiment of the invention, the hyperbranched polymer has no ester bonds within their statistically composed branched structure. The synthesis of the branched structure can be affected by means of ether groups, acid amide groups, carbonate groups and also urethane groups. Tertiary nitrogen atoms and/or tertiary and/or quaternary carbon atoms may function as branching sites.

In another embodiment, the reactive end group, which can react with an isocyanate functional group, are hydroxyl and/or primary and/or secondary amino groups or mercapto groups. In another embodiment of the invention, the embodiment, the reactive are hydroxyl and/or primary and/or secondary amino functions.

In one embodiment, the hyperbranched polymers have an average molecular weight is from 400 to 30,000, in another embodiment, the average molecular weight from 400 to 25,000. In another embodiment, the average molecular weight is from 400 to 20,000.

In another embodiment of the invention, the hyperbranched polymers may be selected from the following groups of the statistically composed types: amino-functional hydrogenated Michael adducts of acrylonitrile with polyamines, such as polyamidoamine, for example, amino-functional polyethyleneimines, as obtainable, for example, by ring-opening polymerization of aziridine and/or its derivatives (J. K. Hong et al., Journal of Colloid and Interface Science, 227, 247–249 (2000)), hydroxyl-functional "polyglycerols" obtainable by ring-opening polymerization of glycidyl and/or its derivatives (e.g. E. J. Vandenberg et al., J. of Polymer Science: Part A: Polymer Chemistry, Vol. 23, 915–949, 1985), amino-functional reaction products of excess polyamines with polyepoxides, amino-functional reaction products of amino-functional reaction products of polycarboxylic acids and polyamines with polyepoxides (e.g. WO 00/22030), amino-functional reaction products of divinyl sulphone and diamines which possess a secondary and a primary amino group (C. Gao et al., Makromol. Chem. Phys. 2001, 202, 2623–2629), hydroxyl-functional polymers obtainable by cationic ring-opening polymerization of hydroxyl-functional oxetanes such as, for example, 3-methyl-3-oxetanemethanol (D. Yan et al., Makromol. Rapid Commun. 21, 557–561, 2000), amino-functional unsaturated polymers of cyclic urethanes obtainable by means of ring-opening polymerization via the intermediates of allyl complexes, having a vinyl group positioned alpha to the urethane oxygen (e.g. M. Suzuki, Macromolecules, 1992, 25, 1071–7072), hydroxyl-functional polymers obtainable by means of ring-opening polymerization from compounds containing carboxyl groups and oxazoline groups (e.g. F. Böhme et al., High Perform. Polym. 13, (2001), 21–31), amino-functional polymers characterized by urea structures and obtainable by reacting 3,5-diaminobenzoyl azide with 5-aminoisophthaloyl azide with elimination of nitrogen and intermediate formation of isocyanates (e.g. A. Ambade et al, J. Polym. Sci., Part A: Polym. Chem. (2001), 39, (9), 1295–1304) hydroxyl-functional polyestermides obtainable by reacting cyclic acid anhydrides with diethanolamine or its derivatives such as, for example, bis(2-hydroxypropyl) amine by ring opening.

In another embodiment, the hyperbranched polymer in the context of this invention is, selected from the group of "hyperbranched polyethyleneimine" having a degree of branching (DB) of between 50–95%. In another embodiment of the invention, the degree of branching is between 60–80%. In another embodiment of the invention, the degree of branching is between 65–75%.

In one embodiment of the invention, the polydisperties of the hyperbranched polymer Mw/Mn is from 0.5–5.00. In another embodiment, the polydispersities Mw/Mn is from 1.0 to 2.5, from the group of polyglycerols having molar weights of from 400 to 100,000 g/mol or in another embodiment from 400 to 30,000 g/mol and Mw/Mn below 1.5 (determined by means of gel permeation chromatography, polypropylene oxide as standard).

In another embodiment the hyperbranched polymer is a polyamino-polyamide polymer with Mw of from 5000 to 15,000 g/mol.

In another embodiment, the hyperbranched polymer is PGI®-5 (Mn=5000 g/mol) or PEI®-25 (Mn=25,000 g/mol) obtainable from Hyperpolymers, Freiburg, Del., from group (3) e.g. "hyperbranched polyglycerols" having molar weights (Mn) of 2000 (PG-2), 5000 (PG-5) and 8000 (PG-8) obtainable from Hyperpolymers, Freiburg, Del., Dendrepox®-IB 100 (Mw=6500), -HB-101 (Mw=8300), -AD-102 (Mw=12,100), -AH-103 (Mw=13,300) obtainable from Epox Limited, Kiryat Shemona, Israel.

If desired, auxiliaries and additives, such as fillers, dyes and pigments, and also catalysts, may be added to the polyurethane of the invention.

In one embodiment, the auxiliaries and additives are those with a reinforcing effect, for example, without being limited, silicatic mineral such as phyllosilicate, e.g. antigorite, serpentine, hornblende, amphibole, christosil, talc, metal oxide such as kaolin, aluminium oxide, titanium oxide and iron oxide, metal salt such as chalk, heavy spar and inorganic pigment, such as cadmium sulphide, zinc sulphide, and also glass or ground asbestos. In another embodiment, the auxiliaries and additives may be natural and synthetic fibrous material such as asbestos, wollastonite glass fibre in various lengths. Fillers may be used individually or in a mixture.

Catalysts such as metal compound and/or tertiary amine compound, which are common in the area of polyurethane chemistry, may be used.

Further details on the other auxiliaries and additives which can be used in the invention are, for example, in the monograph by J. H. Saunders and K. C. Frisch "High Polymers" Volume XVI, Polyurethanes, Parts 2 and 7, Verlag Interscience Publishers 1962 and 1964.

The polyurethanes of the invention comprise, in one embodiment of the invention, 45 to 90% by weight of diisocyanate and/or polyisocyanate, from 7 to 50% by weight of a component, which is a reactive compound with isocyanate, and from 0.2 to 25% by weight of component hyperbranched polymer and from 0 to 20% by weight of auxiliaries and additives.

The process for the preparation of the dendritically modified polyurethane of the invention may be conducted in a various ways.

In one embodiment, the diisocyanate or the polyisocyanate comprises the entire polyhydroxyl compounds as prepolymer is introduced initially. Then, as the second component, the component that is a reactive compound with isocyanate (including catalyst) and the hyperbranched polymer are added together in a mixture.

In another embodiment, the polyhydroxyl compounds are added in part to the mixture of component, which is a reactive compound with isocyanate and hyperbranched polymer and their proportions in the diisocyanate, or the polyisocyanate is reduced accordingly. This process may be used in one embodiment, when the viscosity of component is very high.

In another embodiment, the highly branched polymer can be incorporated into the above-described mixture of isocyanate reactive compound and the hyperbranched polymer by means of a solvent, in which case the solvent can still be distilled off from the mixture before use in the two-component formula with component the diisocyanate or the polyisocyanate.

The polyurethane dendritically modified in accordance with the invention may be used as a two-component system, for example in an adhesive application, but also as mouldings with and without a cellular structure, as thermally curing material for manufacturing mouldings and semi-finished product in the reaction injection moulding process.

The polyurethane of the invention may likewise be used in the form of one-component solventborne adhesive or as one component moisture-curing systems.

When the polyurethane of the invention is used in two component systems, the characteristic numbers (namely the degree of polymerization) are, in one embodiment of the invention in the range from 90 to 140, in another embodiment from 95 to 130 and in another embodiment from 100 to 125.

The polyurethane of the invention may be used as a coating composition from which it is possible to produce coatings and coverings for encapsulating materials, casting compositions, electrical insulating compositions, and moulding compounds prepared by the reaction injection mould process, insulation for buildings, water heaters, refrigerated transport, and commercial and residential refrigeration. Polyurethane adhesives and sealants are used in construction, transportation, marine, and other applications where their high strength, moisture resistance and durability are required. Cushioning for carpet and in upholstered furniture, mattresses, and automobiles. They are also used for packaging.

In another embodiment the polyurethane of the invention may be used in the medical field for implants or in medicines' formulation.

A two component polyurethane adhesive may be prepared by using the polyurethane of the invention as binder. The components are mixed as described above and applied to a substrate, by spreading, knife coating or with a brush and toothed trowel, or by automatic mixing and metering equipment of the prior art. The pot life (namely the time where the polymer can be spread before it is stiffed) of the two component polyurethane adhesive is adjusted when required to the respective end use and the respective substrate by adding catalyst.

Suitable substrates are selected from the group consisting of plastics, metals, wood and glass, textile, concrete, glass fibres, and paper.

The coating comprising the polyurethane of the invention is recovered using high frequency, infrared rays or microwaves, under hot conditions or at room temperature.

The invention also provides substrates coated with coating compositions comprising the polyurethanes of the invention.

Characteristic of all adhesive applications are both an improvement in the tensile shear strength and an improved behaviour in the peel test.

The polyurethane of the invention are notable for good stability, in particular with respect to acids and bases, and also with respect to infestation by microorganisms.

EXAMPLES

In order to characterize the polymer-physical characteristics, prepolymers were prepared with polyethers differing in molecular weight and were chain-extended in one instance with butanediol and in one instance with a mixture comprising butanediol and a hyperbranched polyamide-amine.

Isocyanate Components

Isocyanate Component From Polyether 1

In a stirred flask, 190 g of pure bis (4-isocyanatophenyl) methane were melted at 50° C. and 200 g of a polypropylene glycol of OH number of 56.5 (polyether 1; average molar weight: 2000) were added. After the reaction mixture has been stirred to homogeneity, the temperature was raised to 70° C. with continuing stirring. This temperature was maintained for 2 hours and then the isocyanate content was determined by titration: the amount was 13.8% (theoretical value: 14.19%).

Isocyanate Component From Polyether 2

In a stirred flask, 175 g of pure bis(4-isocyanatophenyl) methane were melted at 50° C. and 200 g of a polypropylene glycol of OH number of 28 (polyether 2; average molar weight: 4000) were added. After the reaction mixture has been stirred to homogeneity, the temperature was raised to 70° C. with stirring. This temperature was maintained for 3½ hours and then the isocyanate content was determined by titration: the amount was 14.4% (theoretical: 14.56%).

Isocyanate Component From Polyether 3

In a stirred flask, 168.2 g of pure bis (4-isocyanatophenyl) methane were melted at 50° C. and 200 g of a polypropylene glycol of OH number of 14 (average molar weight: 8000) were added. After the reaction mixture has been stirred to homogeneity, the temperature was raised to 70° C. with stirring. This temperature was maintained for 3½ hours and then the isocyanate content was determined by titration: the amount was 14.6% (theoretical: 14.78%).

Isocyanate-Reactive Components

Isocyanate-Reactive Component 1

Butane-1,4-diol from Merck

Isocyanate-Reactive Component 2

A mixture of 99.5 parts by weight of butane-1,4-diol and 0.5 part by weight of Epox® AD 102 from EPOX Limited (hyperbranched, amino-functional polyamide-amine), Kiryat Shemona, Israel.

The test was performed as follows:

Each of the isocyanate components 1, 2 and 3 were blended with each the two isocyanate-reactive components (see table 1 below). This was performed by weighing the components into a small polyethylene bag and then intimately mixing them. After mixing, the mixture was knife coated onto a Teflon sheet to give a film with a thickness of from 300 to 400 µm. Recovering of the compound was for seven hours in a forced air oven at 100° C.

The samples prepared were as follows:

TABLE 1

| Designation component | Isocyanate component from | Isocyanate-reactive |
|---|---|---|
| A | Polyether 1 | Component 1 |
| B | Polyether 2 | Component 2 |
| C | Polyether 2 | Component 1 |
| D | Polyether 2 | Component 2 |
| E | Polyether 3 | Component 1 |
| F | Polyether 3 | Component 2 |

Figure 2:
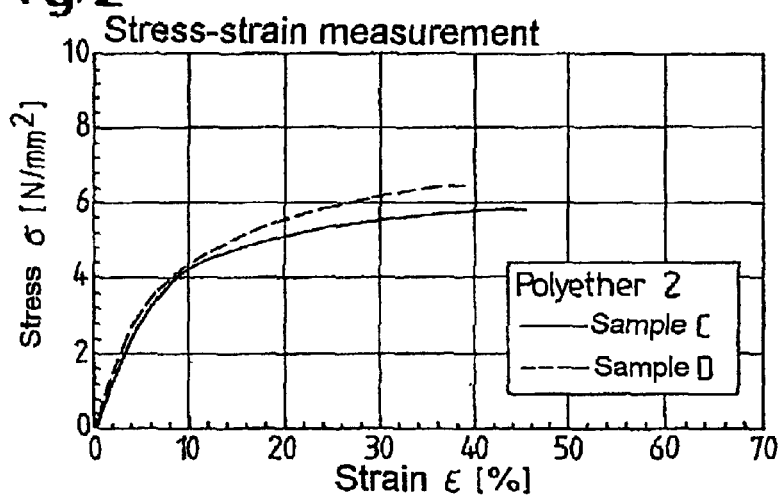
FIG. 2 demonstrates stress-strain measurements of sample C vs. Sample D (see examples).
Figure 3:
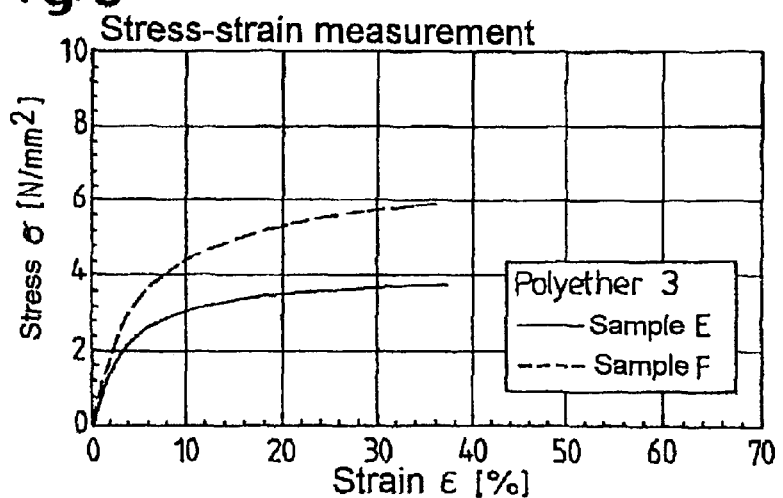
FIG. 3 demonstrates stress-strain measurements of sample E vs. Sample F (see examples).

Stress-strain measurements and also measurements of the complex E-modulus were performed as can be seen from FIGS. 1–3.

The stress-strain measurements were performed in accordance with DIN 53 455 using tensile rods No. 4; the tensile rods were prepared by punching from the polyurethane films produced.

FIGS. 1–3 clearly show that when using the isocyanate-reactive component 2—in comparison to component 1—there is a consistent increase in the stress-strain properties. This indicate an increase in the flexability as well as in the extension property of the modifies polyurethane. As cab be clearly seen is tendency is independent of the molar weight of the isocyanate components employed.

What is claimed is:

1. A process for preparing a dendritically modified polyurethane by reacting i) a diisocyanate and/or polyisocyanate, wherein the diisocyanate and/or polyisocyanate comprises an NCO prepolymer formed from an aromatic polyisocyanate and one or more hydroxyl-containing polyether or vinyl-polymer-modified polyether and/or polycarbonate; ii. a component which is a reactive compound with isocyanate; and iii a hyperbranched polymer which contains reactive end groups which can react with an isocyanate functional group.

2. The process of claim 1, wherein the diisocyanate and/or polyisocyanate are prepolymers having terminal isocyanate group, in the molecular weight range from 400 to 20,000.

3. The process for preparing dendritically modified polyurethane according to claim 1, characterized in that the component which is a reactive compound with isocyanate comprises a hydroxyl-containing, low molecular mass chain extender having a molecular weight of at least 62 and a functionality number of at least 2.

4. The process of claim 3, wherein the component which is a reactive compound with isocyanate further comprises aliphatic, aromatic or cycloaliphatic diamine or triamine having a molecular weight of at least 60.

5. The process for preparing a dendritically modified polyurethane according to claim 1, wherein the hyperbranched polymer has an average molecular weight number of from 400 to 100,000.

6. The process for preparing dendritically modified polyurethane according to claim 1, characterized in that the hyperbranched polymer have a statistically composed branched structure.

7. A process for preparing dendritically modified polyurethane according to claim 1, wherein the group, which is a reactive with isocyanate, are hydroxyl and/or primary and/or secondary amino groups.

8. A coating composition comprising the dendritically modified polyurethane according to claim 1.

9. A process for preparing two component polyurethane adhesive, wherein the dendritically modified polyurethane of claim 1, is used as a binder.

* * * * *